United States Patent [19]

Duong et al.

[11] Patent Number: 5,270,361
[45] Date of Patent: Dec. 14, 1993

[54] ASPHALT COMPOSITION AND PROCESS FOR OBTAINING SAME

[75] Inventors: Quoc D. Duong, Ville Mont Royal; Rhéal Boisvert, Montreal, both of Canada

[73] Assignee: Bitumar R. & D. (2768836 Canada Inc.), Montreal, Canada

[21] Appl. No.: 940,462

[22] Filed: Sep. 4, 1992

Related U.S. Application Data

[63] Continuation-in-part of Ser. No. 840,848, Feb. 25, 1992, abandoned.

[51] Int. Cl.$^5$ ................. C08L 7/00; C08G 33/20
[52] U.S. Cl. ........................ 524/80; 524/59; 524/68; 524/71; 428/489
[58] Field of Search .......... 524/71, 80, 59, 68; 428/480, 489

[56] References Cited

U.S. PATENT DOCUMENTS

| | | | |
|---|---|---|---|
| 3,671,467 | 6/1972 | Gunther | 528/403 |
| 4,145,322 | 3/1979 | Maldonado et al. | 524/68 |
| 4,224,436 | 9/1980 | Doss | 528/275 |
| 4,242,246 | 12/1980 | Maldonado et al. | 524/71 |
| 4,330,449 | 5/1982 | Maldonado et al. | 524/68 |
| 4,437,896 | 3/1984 | Partanen | 524/59 |
| 4,554,313 | 11/1985 | Hagenbach et al. | 524/68 |
| 4,567,222 | 1/1986 | Hagenbach et al. | 524/476 |
| 4,609,696 | 9/1986 | Wilkes | 524/71 |
| 4,992,492 | 2/1991 | Sainton | 524/71 |

FOREIGN PATENT DOCUMENTS

| | | |
|---|---|---|
| 1109191 | 9/1981 | Canada . |
| 1137242 | 12/1982 | Canada . |
| 1137243 | 12/1982 | Canada . |
| 1209293 | 8/1986 | Canada . |
| 3819931 | 12/1989 | Fed. Rep. of Germany . |

*Primary Examiner*—Paul R. Michl
*Assistant Examiner*—Olga Asinovsky
*Attorney, Agent, or Firm*—Merchant, Gould, Smith, Edell, Welter & Schmidt

[57] ABSTRACT

In accordance with the present invention, there is provided an asphalt composition which incorporates asphalt in admixture with synthetic or natural rubber and elemental selenium or an organo-selenium. There is also provided a process for preparing the above asphalt composition. Preferably, the rubber is obtained from waste tires or tubes.

17 Claims, 2 Drawing Sheets

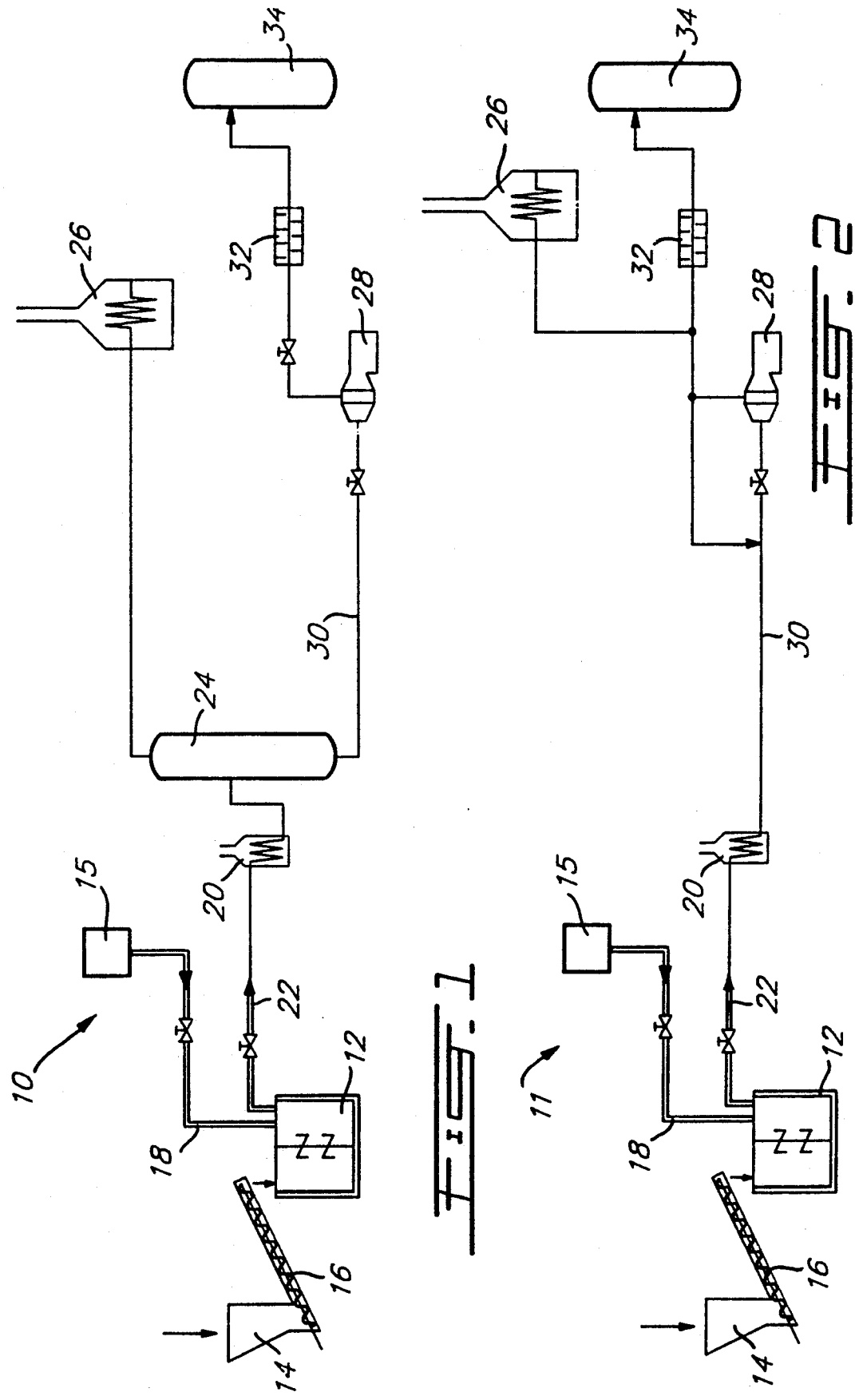

ASPHALT COMPOSITION AND PROCESS FOR OBTAINING SAME

CROSS REFERENCE

This is a C.I.P. of application Ser. No. 840,848 filed Feb. 25, 1992, now abandoned.

TECHNICAL FIELD

The invention relates to an asphalt (or bitumen) composition, and its process of preparation.

BACKGROUND OF THE INVENTION

The elimination of used tires is becoming an increasingly difficult problem throughout the world. As an example of the importance of the problem, over 200,000 tons of waste tires and tubes are produced each year in Canada. In the United States of America, that amount is close to 4,000,000 tons.

Although it is very attractive to consider the possibility of using waste rubber products such as tires or tubes in asphalt (or bitumen) compositions, there are a number of significant obstacles related to such use. Scrap tires contain different types of vulcanized rubber, for example polyisoprene, polybutadiene, styrene-butadiene, butyl, ethylene-propylene-diene, as well as fillers, plasticizers, surfactants and the like. Sometimes, tires contain up to 31 different elastomers. Ground rubber or crumb rubber does not disintegrate readily, because of the crosslinking of the polymeric material that takes place by the vulcanization process with sulfur. The additional chemical bonds created during this vulcanization render impossible the complete dissolution of the polymer in hot bitumen, thus causing problems of stability and storage of the material. Furthermore, such mixtures are not homogeneous, and form two phases of different density which are partially dispersed one in the other. The system tends to decant and causes the upper layers, which have a lower density, to be constituted of polymer, while the lower layers, which have a higher density, are constituted of bituminous material.

At high temperature, conventional asphalt compositions, that is asphalt cement for use in pavement which meet ASTM-D-946-74 or ASTM-D-3381-83 specifications, become fluid and even sticky, causing aggregate deformation or rutting, while at lower temperatures, they become fragile and crack easily. Toughness and durability of asphalt compositions are directly proportional to the resistance of the asphalt to deformation under the effect of stress.

DE 38 19 931 discloses polymer-modified bitumen compositions comprising bitumen in admixture with an olefin, the latter having been oxidized before being mixed with bitumen. These compositions are alleged to be binders in hot-mix asphalt such as pavements. These compositions, as useful as they could be, are however extremely expensive, because of the use of virgin olefins, that is, brand new synthetic olefins which have never been used before.

CA 1,109,191; CA 1,209,295; CA 1,137,242 and CA 1,137,243 (corresponding to U.S. Pat. Nos. 4,145,322; 4,554,313; 4,567,222; 4,242,246 and 4,330,449) disclose processes of preparation of asphalt compositions which comprise mixing vulcanized virgin olefins with conventional bitumen. The vulcanization is performed with sulfur or polymeric sulfur derivatives. As explained above, such compositions are extremely costly because of the use of virgin olefins.

U.S. Pat. No. 4,992,492 discloses a bitumen and reclaimed rubber powder binder for surfacing roadways. The material and the process for preparing it are however limited by the size of the particles of reclaimed rubber. If the size of the particles is too important, the resulting mixture, or binder, is unstable, non homogeneous, and cannot be stored. It is also obvious that the smaller the particles of reclaimed rubber are, the higher their cost.

U.S. Pat. No. 4,437,896 is concerned with synthetic bitumen compositions comprising gilsonite, tall oil and oil pitch. Again the size of the reclaimed rubber particles that can be used in the process of this patent cannot exceed 850 microns, which constitutes an important drawback.

U.S. Pat. No. 4,609,696 teaches asphalt emulsion, which may contain reclaimed rubber. The particles involved in the process are also limited to a size of 850 microns, and preferably 300 microns.

It would therefore be highly desirable to obtain an asphalt composition having good impact resistance at low temperature and excellent rheological and mechanical properties. Improving these properties over a range of temperatures provides a superior load bearing capacity of pavement, and a better ability to resist to ground movements or other stresses. Waste rubber such as waste tires and tubes would preferably be used in the composition. Preferably, such asphalt composition would be obtained through a versatile and inexpensive process. In order to further reduce the costs of such asphalt composition, it would be necessary that it be prepared with rubber particles of the greatest possible size.

SUMMARY OF THE INVENTION

In accordance with the present invention, there is provided an asphalt composition suitable for pavement, shingle and the like, which incorporates synthetic or natural rubber cross-linked with selenium or selenium salt. More specifically, the present invention is concerned with an asphalt composition comprising:

from 60 to 99% by weight of asphalt (or bitumen);
from 1 to 40% by weight of synthetic or natural rubber; and
from 0.05 to 0.5% by weight of elemental selenium or organo-selenium.

The present invention is also concerned with a process for preparing the above asphalt composition, which comprises the steps of:

a) mixing asphalt with synthetic or natural rubber at a high temperature in order to have the rubber particles in suspension;
b) injecting air in the mixture of step a) under high pressure;
c) homogenizing the mixture with a dispersing device;
d) stabilizing the mixture by incorporating the elemental selenium or organo-selenium therein; and
c) recovering the asphalt composition.

In a preferred embodiment, the rubber is waste tires or tubes.

In a second aspect of the process of the present invention, the mixture of step a) remains in a reactor for a period of time varying from 1 to 15 hours wherein air is injected.

In a third aspect of the process of the present invention, a second reactor, preferably adjacent to the first reactor is incorporated in the system when a longer period of devulcanization is required.

IN THE DRAWINGS

FIG. 1 illustrates a first embodiment of a system suitable for carrying out the process of the present invention;

FIG. 2 illustrates a second embodiment of a system suitable for carrying out the process of the present invention.

DETAILED DESCRIPTION OF THE INVENTION

Figure 3:
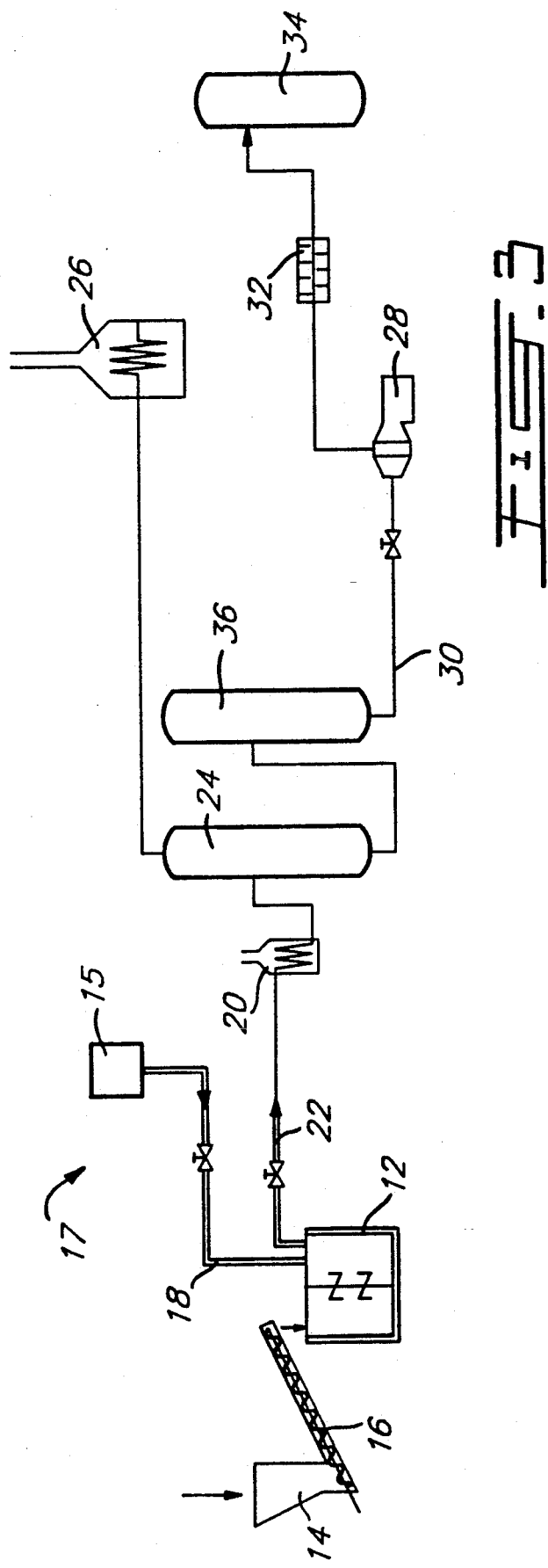
FIG. 3 illustrates a third embodiment of a system suitable for the carrying out the process of the present invention.

As indicated above, the present invention provides an asphalt composition which incorporates asphalt in admixture with synthetic or natural rubber and elemental selenium or organo-selenium. Waste rubber obtained from old tires is the preferred starting material for obvious economic reasons. In view of the generalized concern towards the environment, the present invention represents an important step forward, since it allows the recuperation of waste rubber originating from old tires or tubes. Furthermore, the resulting asphalt composition is simple to prepare, with the costs of starting materials and experimental procedures being reduced significantly.

It is common knowledge that the rubber employed in the manufacture of tires and tubes is vulcanized, that is, sulfur bonds have been introduced in the polymeric chain, with the result that the physical properties of the material thus treated are improved while its elasticity is maintained. To be suitable for the purposes of the present invention, such waste rubber is treated to remove these sulfur bonds by dehydrogenation, preferably with air injected under pressure and at high temperature. To the resulting devulcanized rubber is then added elemental selenium or organo-selenium, such as AC-8111 or UN-2658, manufactured and sold by Anachemia, or Refined Selenium Glass Garde manufactured and sold by Noranda Minerals Inc. The selenium added in the mixture is believed to act as a substitute for the removed sulfur, thus being a cross-linking agent.

Referring to the drawings, FIG. 1 shows a scheme of the first embodiment, referred to as system 10, suitable for the preparation of the asphalt composition of the present invention. In detail, rubber particles are brought into mixer 12 from dispenser 14 through conveyor 16, while asphalt (bitumen) is brought into mixer 12 from tank 15 through pipe 18. The temperature of the mixture in mixer 12 is maintained at 160°-200° C. and the mixture remains therein under agitation until the rubber particles are uniformly suspended. The resulting blend is then forwarded through pipe 22 into exchanger 20, wherein the temperature is further raised to about 230° C. The blend thus heated is placed in a reactor 24 for a period of time varying from about 1 to 12 hours, depending on the intended use of the asphalt composition, during which air is injected in the reactor, preferably from the bottom, at a pressure of from about 10 to about 50 psi (pounds per square inch). It is to be noted that the pressure could be higher depending on the height of the reactor. The gas produced in reactor 24 is preferably purified by air filter or purifier 26 before being rejected in the atmosphere.

The blend is subsequently forwarded into dispersing device 28 through pipe 30, to homogenize the blend. Pressurized air is injected through a hole in pipe 30 to ensure completeness of the dehydrogenation reaction. Dispersing device 28 consists in a pair of toothed discs turning at 3600 RPM, which permit the homogenization, as well as the acceleration of the dehydrogenation reaction. Additives are preferably added in the blend prior to the homogenization. It is imperative that the liquid composition be homogenized to eliminate storage problems. Elemental selenium or organo-selenium is then added into the homogenized composition, which subsequently proceeds through static mixer 32 before being recovered and stored in container 34. The storage temperature in container 34 is preferably about 150°-175° C. The system 10 illustrated in FIG. 1 and the corresponding process provides an asphalt composition suitable for pavements, shingles, or any other industrial or domestic uses of asphalt. Some minor experimental adjustments may however be necessary, such as the temperature, the pressure, allowed time in the reactor and the like, depending on the intended use of the asphalt composition. All these adjustments will become apparent to those skilled in the art.

The system 11 illustrated in FIG. 2 is similar to the one shown in FIG. 1, with the exception that reactor 24 has been removed. This system is suitable for preparing asphalt composition to be utilized for pavements since such compositions require a shorter reaction time, because the asphalt needs to be softer.

The system 17 illustrated in FIG. 3 is also similar to system 10 of FIG. 1, except that a second reactor 36 has been incorporated in the system. This system is preferred for the preparation of shingle or roofing products, which requires much harder and tougher asphalt. Though more expensive than the preceding systems, system 17 permits a satisfactory volume of asphalt to be produced in a given period of time.

The key steps in the process of the present invention are the injection of air in the blend followed by homogenization in the dispersing device, particularly when the rubber particles are obtained from waste tires as described above. In this specific situation, if air is not injected, it is not possible to obtain a homogeneous composition after the passage of the blend into dispersing device 28, which results in the production of material of poor quality and stability.

Another critical point to consider is the fact that the rubber composition of waste tires or tubes is different, sometimes significantly, from one manufacturer to another. Accordingly, many samples were tested to verify their processability and the properties of the asphalt composition containing same. The results have shown that any kind of used tires can be incorporated in the asphalt composition of the present invention with satisfactory results.

Another important feature of the present invention, is the size of the particles of waste rubber which can be used. Typically, the particles can be of a size of up to ½ inch thick. Such particles are about ten times bigger than those presently employed.

It will become obvious to anyone skilled in the art that non-vulcanized waste rubber can also be used in the preparation of the asphalt composition of the present invention.

The composition of the asphalt containing the waste rubber products will depend on the particular requirements in accordance with its intended use. The range of each component is as follows:

from 60 to 99% by weight of asphalt, preferably from 80 to 95%;

from 1 to 40% by weight of rubber, preferably from 5 to 20%; and from 0.05 to 0.5% by weight of elemental selenium or organo-selenium, preferably elemental selenium, in a preferred concentration of from 0.1 to 0.3%.

As an example of synthetic rubber capable of being used instead of devulcanized waste rubber, there may be mentioned styrene-butadiene-styrene (SBS), styrene-butadiene-rubber (SBR), polyethylene, polyisoprene, polybutylene, polychloroprene (neoprene), nitrile rubber (acrylonitrile butadiene), butyl rubber (copolymer of isobutylene and isoprene) polyacrylonitrile and the like.

Since the price of waste tires is relatively low, particularly for large particles, the costs related to the preparation of the asphalt composition of the present invention are drastically reduced when compared to the costs of preparation of conventional asphalt compositions. Accordingly, it becomes obvious that the use of waste tires or tubes represents the most preferred embodiment of the present invention.

The consistency of the asphalt can be modified with a so-called petroleum fraction, which can be described as a light or medium cycle oil obtained from the distillation of oil. Such product, for example L.C.O. (Light Cycle Oil) manufactured and sold by Shell Oil, is readily available from any company involved in oil refining, and is incorporated in the mixture together with the rubber particles. The concentration of this petroleum fraction in the asphalt composition varies from 2 to 20% by weight of the final composition, depending on the mechanical properties required.

Preferably, the dehydrogenation is carried out at a temperature of about 200°-260° C. Such dehydrogenation process is well known in the art, and can be carried out in any of the systems illustrated in FIGS. 1-3. After the addition of elemental selenium or an organo-selenium, the mixture is agitated for a period of time varying from 30 minutes to 3 hours at a temperature of 160°-180° C. depending on the starting materials and the properties required for the asphalt composition.

Polymeric additives such as styrene-butadiene-styrene (SBS), styrene-butadiene-rubber (SBR) and the like can be added in a concentration of from 0 to 5% by weight of the final asphalt composition. These additives improve the elongation properties and elasticity of the asphalt. Again, the concentration of these additives will depend on the desired specifications of the asphalt composition.

The process of the present invention is more efficient and especially more economical than the existing conventional processes. The time of reaction is greatly reduced which results in a very limited degradation, if any, of the materials present in the composition. Furthermore, the process of the present invention does not produce liquid or solid wastes, and possesses an enhanced capacity of production.

The rheological and mechanical properties of the asphalt composition of the present invention referred to in the examples, and more particularly in Tables 1 and 2, are as follows:

PVN: penetration and viscosity number (CANCGSB-2) 16-3-M-90;

the penetration is measured by the standardized procedure NQ-2300-270 or ASTM-D-5;

the softening point is measured by the ring and ball method ASTM-D-36;

the viscosity is measured using NQ-2300-600 or ASTM-D-21-70;

the Frass point (fragility point) is measured using ZP80-53; and the storage stability is measured using DGA-S-5610-4;

The elasticity, resilience and ductility tests were performed under the current standard methods fixed by the ASTM Committee.

The following Examples are provided to illustrate the present invention rather than limit its scope. It should be noted that the expression "crumb rubber" cited in the Examples, refers to rubber obtained from waste tires or tubes.

EXAMPLE 1

A mixture of 8.37 kg of Asphalt 150/200 pen, 0.80 kg of petroleum fraction and 0.80 kg of crumb rubber is heated at 250° C. and stirred for 2 hours under pressurized air stream in a dehydrogenation tower. Subsequently, 0.03 kg of selenium are added, and the resulting mixture is further agitated mechanically for 2 hours. The physical properties of the resulting asphalt composition are illustrated in Table 1.

EXAMPLE 2

Following the procedure of Example 1, but reducing the concentration of Asphalt 150/200 pen to 8.27 kg, and incorporating 0.15 kg of styrene-butadiene-styrene (SBS), another asphalt composition was obtained. The physical properties of this composition are also illustrated in Table 1.

TABLE 1

|  | Composition of Example 1 | Composition of Example 2 |
| --- | --- | --- |
| Penetration at 25° C. | 93 1/10 mm | 85 |
| Viscosity | 650 cst | 900 cst |
| P.V.N. | 0.43 | 0.80 |
| Softening point | 52° C. | 60° C. |
| Penetration index | 1.0 | 2.0 |
| Frass point | −20° C. | −25° C. |
| Storage stability | 0.7° C. | 0.7° C. |

The results provided in Table 2 further illustrate the advantages of the asphalt composition of the present invention as compared to the presently existing conventional asphalt composition.

TABLE 2

|  | Conventional 80–100 | Composition of Example 1 | Composition of Example 2 |
| --- | --- | --- | --- |
| Penetration at 25° C. 100 g, 5 s, 0.1 mm | 80–100 | 93 | 85 |
| Penetration at 4° C. 200 g, 60 sec, 0.1 mm | 43.5 | 62 | 64 |
| % Penetration 4° C./25° C. | 47.8 | 65 | 75 |
| Flash point (°C.) | >230 | >230 | >230 |
| Viscosity at 135° C. (mm²/s) | 260 (B) 185 (C) | 630 | 900 |
| Softening point (°C.) | 40 | 52 | 60 |
| Ductility at 4° C. | 6 | 10 | 10 |

TABLE 2-continued

|  | Conventional 80-100 | Composition of Example 1 | Composition of Example 2 |
| --- | --- | --- | --- |
| 5 cm/min (cm) |  |  |  |
| Solubility (% weight) in trichloroethylene | 99.0 | 95.0 | 95.0 |
| P.V.N. | −0.65 | +0.43 | +0.80 |
| Elasticity at 10° C. | — | 40% | 60% |
| Ratio strength/ductility | — | 0.20 | 0.40 |
| Resilience | — | 11 | 18 |

EXAMPLE 3

40 tons of an asphalt composition of the present invention were prepared in the following manner: A mixture comprising 89.9% by weight of asphalt 157 pen and 10% by weight of crumb rubber (size of the particles=20 mesh) are blended for 0.5 hour at 230° C. Air is then injected at a pressure 50 psi at a 75 cubic feet per minute (CFM), and the blend is then homogenized in the dispersing device, which has a capacity of 40 tons/hour, for 2 hours. Subsequently, 0.1% of elemental selenium is introduced in the homogenized product, and further agitated for 2 to 3 hours. The asphalt composition recovered can be stored for an extended period of time without suffering from any instability problems. The test results of this composition are illustrated in Table 3.

TABLE 3

| PROPERTIES (TYPICAL) | BEFORE TFOT | AFTER TFOT |
| --- | --- | --- |
| PENETRATION |  |  |
| 25° C./100 g/5 sec | 83.5 dmm | 56.8 |
| 4° C./100 g/5 sec | 16.7 dmm | 13.8 |
| 4° C./200 g/60 sec | 51.8 dmm | 42.8 |
| VISCOSITY (135° C.) | 636 mm$_2$/s | 965 |
| SOFTENING POINT | 51.5° C. | 56° C. |
| DUCTILITY (4° C.) | 7.5 cm | 4.0 cm |
| PEN 4° C./PEN 25° C. | 62% | 75% |
| SOLUBILITY IN TRICHLOROETHYLENE | 97.72% | — |
| PVN | +0.26 | +0.40 |
| PVN GROUP | AA | AA |
| P.I. (4° et 25° C.) | 1.26 | 2.18 |
| FLASH POINT (C.O.C.) |  |  |
| STORAGE STABILITY | ±1° C. | — |
| CHANGE IN MASS | — | 0.27% |
| RETAINED PENETRATION | — | 68% |

Note:
TFOT represents: Thin Film Oven Test

EXAMPLE 4

40 tons of an asphalt composition of the present invention were prepared in the same conditions provided in Example 3, except that the size of the particles of crumb rubber were raised to 4 mesh (about ¼ inch). The test results of this composition are illustrated in Table 4.

TABLE 4

| PROPERTIES (TYPICAL) | BEFORE TFOT | AFTER TFOT |
| --- | --- | --- |
| PENETRATION |  |  |
| 25° C./100 g/5 sec | 96.6 dmm | 61.0 |
| 4° C./100 g/5 sec | 21.0 dmm | 14.5 |
| 4° C./200 g/60 sec | 57.0 dmm | 45.2 |
| VISCOSITY (135° C.) | 494 mm$_2$/s | 882 |
| SOFTENING POINT | 50.5° C. | 56° C. |
| DUCTILITY (4° C.) | 8.5 cm | 5.7 cm |
| PEN 4° C./PEN 25° C. | 58% | 74% |
| SOLUBILITY IN TRICHLOROETHYLENE | 97.72% | — |
| PVN | +0.1 | +0.36 |
| PVN GROUP | AA | AA |
| P.I. (4° et 25° C.) | 1.50 | 2.07 |
| FLASH POINT (C.O.C.) |  | — |
| STORAGE STABILITY | ±1° C. | — |
| CHANGE IN MASS | — | 0.24% |
| RETAINED PENETRATION | — | 61% |

Note:
TFOT represents: Thin Film Oven Test

While the present invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A process for obtaining a homogeneous asphalt composition comprising the steps of:
   a) mixing asphalt with synthetic or natural waste rubber particles at a temperature of from 160° to 200° C. in order to have the particles in suspension in the asphalt;
   b) raising the temperature to about 220° to 260° C.;
   c) injecting air under high pressure;
   d) homogenizing the mixture;
   e) incorporating elemental selenium or organo-selenium, and agitating; and
   f) recovering the homogeneous asphalt composition.

2. A process according to claim 1, wherein at least one reactor is incorporated between step b) and step c), and wherein the mixture is allowed to stand for a period of time varying from 1 to 15 hours.

3. A process according to claim 2, wherein the number of reactors is two.

4. A process according to claim 2, wherein the air is injected from the bottom of the reactor.

5. A process according to claim 1, wherein the mixture is homogenized by a dispersing device.

6. A process according to claim 1, wherein the rubber particles are obtained from waste tires or tubes and are up to ¼" thick.

7. A process according to claim 1, wherein the rubber particles have a thickness of ¼" wide or less.

8. A process according to claim 1, wherein the air is injected at a pressure of from about 10 to 50 psi.

9. A process according to claim 1, wherein a petroleum fraction is incorporated in the mixture of step a).

10. A process for obtaining a homogeneous asphalt composition comprising the steps of:
    a) mixing from 60 to 99% by weight of asphalt with 1 to 40% by weight of rubber particles obtained from waste tires or tubes at a temperature of from 160° to 200° C. in order to have the particles in suspension in the asphalt;
    b) heating the mixture at a temperature of about 230° to 250° C.;

c) injecting air under high pressure;
d) homogenizing the mixture with a dispersing device;
e) incorporating 0.05 to 0.5% by weight of elemental selenium and agitating for about 0.5 to 5 hours; and
f) recovering the homogeneous asphalt composition.

11. An asphalt composition comprising:
   from 60 to 99% by weight of asphalt;
   from 1 to 40% by weight of synthetic or natural waste rubber; and
   from 0.05 to 0.5% by weight of elemental selenium or organo-selenium.

12. An asphalt composition according to claim 11, comprising:
   from 80 to 95% by weight of asphalt;
   from 5 to 20% by weight of synthetic or natural rubber; and
   from 0.1 to 0.3% by weight of elemental selenium.

13. An asphalt composition according to claim 11, wherein the rubber is obtained from waste tires or tubes.

14. An asphalt composition according to claim 11, further comprising from 2 to 20% by weight of petroleum fraction.

15. An asphalt composition according to claim 11, further comprising one or more additives selected from the group consisting of styrene-butadiene-styrene (SBS) and styrene-butadiene-rubber (SBR).

16. An asphalt composition comprising:
   89.9% by weight of bitumen;
   10.0% by weight of rubber obtained from waste tires or tubes;
   0.1% by weight of elemental selenium.

17. A process for obtaining a homogeneous asphalt composition comprising the steps of:
   (a) mixing asphalt with synthetic or natural virgin rubber particles at a temperature of from 160° to 200° C. in order to have the particles in suspension in the asphalt;
   (b) raising the temperature to about 220° to 260° C.;
   (c) homogenizing the mixture;
   (d) incorporating and elemental selenium or organo-selenium, and agitating; and,
   (e) recovering the homogeneous asphalt composition.

* * * * *